(12) United States Patent
Rogala

(10) Patent No.: US 7,327,061 B2
(45) Date of Patent: Feb. 5, 2008

(54) AC GENERATOR AND METHOD

(76) Inventor: Richard L. Rogala, HC1, Box 264A, L'Anse, MI (US) 49946-9606

( * ) Notice: Subject to any disclaimer, the term of this patent is extended or adjusted under 35 U.S.C. 154(b) by 166 days.

(21) Appl. No.: 11/259,025

(22) Filed: Oct. 25, 2005

(65) Prior Publication Data
US 2007/0090712 A1    Apr. 26, 2007

(51) Int. Cl.
H02K 7/20    (2006.01)
(52) U.S. Cl. .................... 310/112; 310/128; 310/233
(58) Field of Classification Search ........ 310/112–113, 310/128, 233, 234
See application file for complete search history.

(56) References Cited

U.S. PATENT DOCUMENTS

| | | | |
|---|---|---|---|
| 2,479,589 A | 8/1949 | Parker | 172/120 |
| 3,435,267 A | 3/1969 | Beyersdorf et al. | 310/168 |
| 3,521,099 A | 7/1970 | Jewusiak | 310/168 |
| 3,983,430 A | 9/1976 | Howard | 310/155 |
| 4,031,421 A | 6/1977 | Geiger | 310/112 |
| 4,117,388 A | 9/1978 | Roche | 322/25 |
| 4,316,112 A | 2/1982 | Waldron et al. | 310/258 |
| 4,473,752 A | 9/1984 | Cronin | 290/38 |
| 4,612,470 A | 9/1986 | Smith, Jr. et al. | 310/273 |
| 4,691,133 A * | 9/1987 | Mongeau | 310/178 |
| 4,948,998 A * | 8/1990 | Fink et al. | 310/127 |
| 5,317,228 A | 5/1994 | Leupold | 310/178 |
| 5,650,681 A | 7/1997 | DeLerno | 310/164 |
| 6,175,217 B1 | 1/2001 | Da Ponte et al. | 322/19 |
| 6,246,146 B1 * | 6/2001 | Schiller | 310/268 |
| 6,407,466 B2 | 6/2002 | Caamano | 290/52 |
| 6,603,233 B2 * | 8/2003 | Strohm | 310/178 |
| 6,838,801 B2 * | 1/2005 | Matsuda | 310/233 |

OTHER PUBLICATIONS

PCT Notification of Transmittal of The International Search Report and the Written Opinion of the International Searching Authority, or the Declaration mailed Oct. 10, 2007, re PCT/US06/41503 filed Oct. 23, 2006.

* cited by examiner

Primary Examiner—Thanh Lam
(74) Attorney, Agent, or Firm—Baker Botts L.L.P.

(57) ABSTRACT

One aspect of the invention is a generator with at least two commutators mounted on a rotatable shaft. At least two magnetically conductive bars may be mounted in an opposed relationship with at least one of the bars passing through a wire coil. At least two magnets may also be mounted in an opposed relationship. The bars and magnets may be mounted such that they extend between the commutators. In various positions, a magnetic field passes through the two commutators, one of the bars and one of the magnets. The magnet field in the bars changes due to rotation of the shaft and current is induced into the wire coil.

20 Claims, 8 Drawing Sheets

AC GENERATOR AND METHOD

TECHNICAL FIELD OF THE INVENTION

This invention relates generally to the generation of alternating current (AC) electricity and more particularly to an improved AC generator.

BACKGROUND OF THE INVENTION

In conventional AC generators, efficiency is lost due to the loss of magnetic flux transference due to air gaps between moving parts of a magnetic toroid, and due to rotation resistance due to magnetic attraction and repulsion forces while generating alternating current electricity.

SUMMARY OF THE INVENTION

One aspect of the invention is a generator with at least two commutators mounted on a rotatable shaft. At least two magnetically conductive bars may be mounted in an opposed relationship with at least one of the bars passing through a wire coil. At least two magnets may also be mounted in an opposed relationship. The bars and magnets may be mounted such that they extend between the commutators. In various positions, a magnetic field passes through the two commutators, one of the bars and one of the magnets. The magnet field in the bars changes due to rotation of the shaft and current is induced into the wire coil.

The invention has several important technical advantages. Embodiments of the invention may have none, some, or all of these advantages. The invention allows a generator to be made out of a small number of components and at a reasonable expense. The invention may achieve good efficiency as secondary magnetic fields created by induction of current interfere little with the primary magnetic fields. This benefit has a secondary benefit in that stronger magnets may be able to be used than in conventional generators due to the reduced effect of secondary magnetic fields. In some embodiments, various methods of adjustment may be provided that allow the generator to have increased efficiency due to reduction in air gaps between the commutators and bars and/or magnets.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
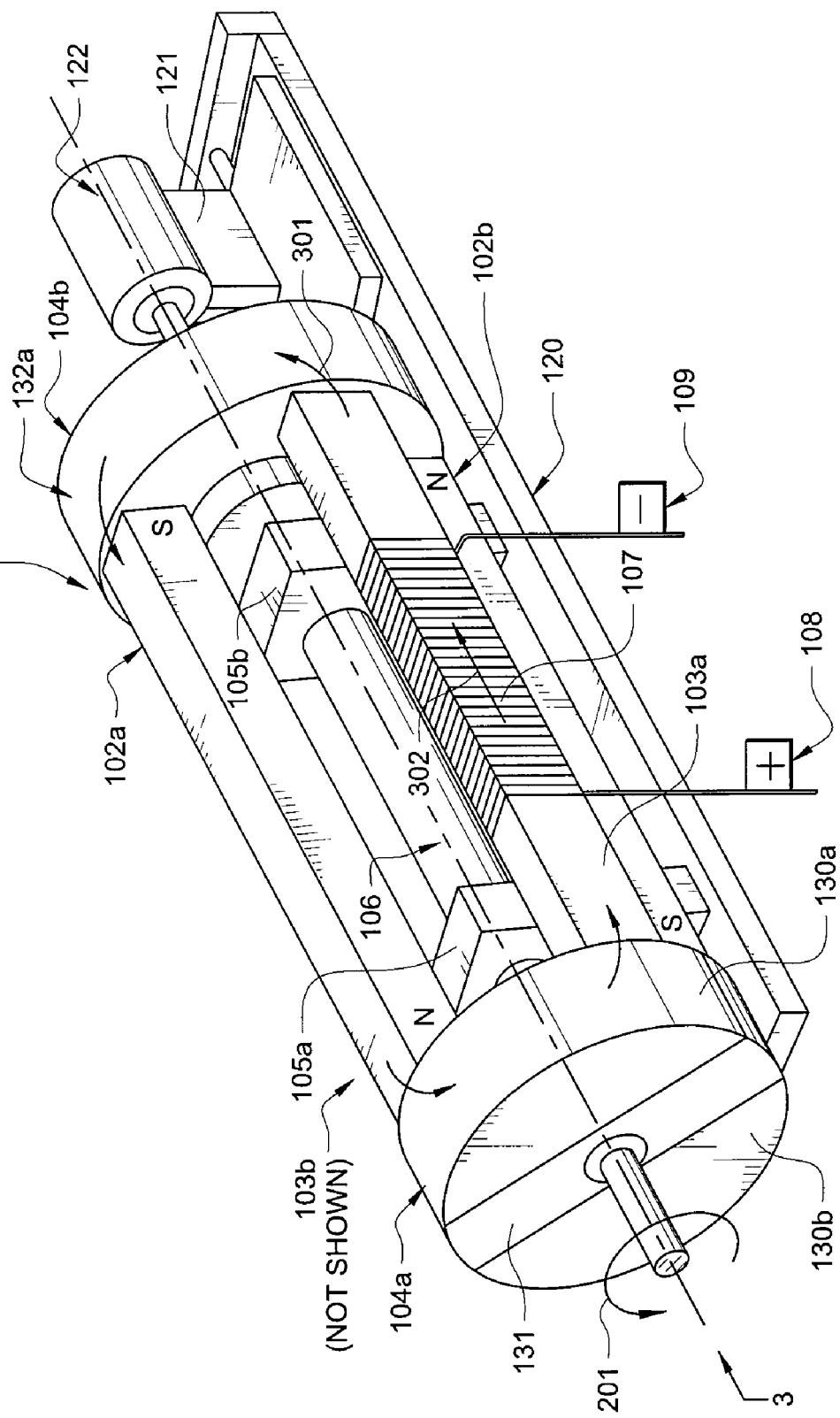
FIG. 1 is a diagrammatic illustration of one embodiment of an electrical generator constructed in accordance with the invention in a first position of rotation.

The preferred embodiment of the present invention and its advantages are best understood by referring to FIGS. 1 through 8 of the drawings, like numerals being used for like and corresponding parts of the various drawings.

The disclosed apparatus may be used to generate AC-electricity. It may include a mounting base to which may be attached (either directly or indirectly), two or more bearing blocks, two or more magnets and two magnetically conductive bars with wire coils wrapped about them. The bearings may allow a rotating shaft to pass through them, which may have multiple commutators mounted thereon. The commutators (as the term is used in this document) may have two or more magnetically conductive sections within a disk (or other) shape, and these sections may be symmetrical (or asymmetrical). The conductive sections of a commutator may line up with substantially equivalent sections of another commutator on the shaft.

As the commutators and shaft rotate, the magnetically conductive sections of the commutators align with a magnetically conductive bar and a magnet, which creates a magnetic flux through the commutator sections, a magnetically conductive bar, and a magnet. The flux through the magnetically conductive bar causes an electrical current to be generated in the coil, which has a positive and negative polarity in the two ends of the wire. As the rotating commutators continue about the 360 degree full cycle of rotation, the second position of alignment is 90 degrees to the first. At the second position, the second magnet is supplying the magnetic flux to the aforementioned bar and wire coil but this magnet may be oriented with its north end opposite that of the previous magnet. This then provides a magnetic flux in the opposite direction through the wire coil than was provided at position 1. This switched magnetic flux through the wire coil switches the electrical polarity each time another 90 degrees of commutator rotation occurs.

Alternating current (AC) electricity is therefore created. A gasoline powered motor (or other type of motor, turbine, or other apparatus) may be provided to rotate the shaft and commutator assembly. The motor may be mounted to an adjustable plate which may articulate in the direction of the shaft. This pulling or pushing on the motor may correspondingly push or pull on the commutator and shaft assembly due to the motor's coupling with the shaft assembly. This adjustment may allow the centering of the commutator assembly such that the air gaps between the commutators and magnets/bars are substantially equal. This adjustment may allow reduction of the air gaps, which may improve the efficiency of the generator. The thickness of a shaft shim may be adjusted to reduce the air gap after centering it. Lower air gaps may typically increase the magnetic flux transfer across the air gap.

In one example configuration, the motor strength is designed to overcome resistance to rotation due to magnetic attraction and repulsion forces as the commutators lineup with the magnets and coil bars and then rotate out of alignment. The four positions of alignment per revolution are located at each 90 degrees of rotation in the example described above. In an alternative configuration, one can substantially reduce the effect of magnetic attraction/repulsion forces by connecting a second apparatus shaft to shaft with a coupling. The second apparatus may have its magnets and coil bars oriented 45 degrees from the first apparatus. This orientation may cause the magnetic attraction forces of the first apparatus to be counterbalanced by the repulsion forces occurring in the second apparatus. The torsional forces are thereby reduced due to the coupling between the shaft of apparatus one and apparatus two. This substantial reduction of drag may result in a more favorable power out to power in ratio.

In this document, the term "magnetically conductive" is meant to refer broadly to the ability of a material to conduct magnetic flux. Examples of magnetically conductive materials that could be used include superconductors (which may be ceramic), iron, nickel, cobalt, various alloys, or other materials that exhibit good magnetic permeability. In the preferred embodiments, ferrous metal bars are used and ferrous metal sections are used in the commutators. However, other magnetically conductive materials (which may or may not be metal) may also be used without departing from the scope of the invention. The term "bar" refers to any type of member and can, but need not, be made of metal.

In the illustrated embodiments, the bars and magnets are mounted such that their cross section is completely within the cross-section of the commutators. However, all or a portion of their cross section could be outside of the cross section of the commutators without departing from the scope of the invention. The invention is not limited to any particular mechanical structure for orienting and/or connecting the various parts of the embodiments described herein.

In preferred embodiments, the pairs of commutators, bars, and magnets will be substantially similar but could have different characteristics. The invention does not exclude the use of different types of bars, magnets, or commutators. Differences could be in dimensions, shape, size, material, etc.

With reference to the drawings and in operation the present invention provides an apparatus to generate alternating current electricity. On embodiment of a generator as shown in FIG. 1 is made up of magnets 102A and 102B and magnetically conductive bars 103A and 103B which have wire coils 107A and 107B wound about the bars 103A and 103B. In this embodiment, copper wire is used for the wire coils 107A and 107B but any electrically conductive wire could be used without departing from the scope of the invention. While in this embodiment, a single coil is illustrated around each bar 103A and 103B, multiple coils could be wound around each bar or bars could be provide without coils without departing from the scope of the invention. The two magnets 102A/102B and two coil bars 103A/103B may be mounted (either directly or indirectly) onto two bearing blocks 105A and 105B which, in this example, have threaded holes by which screw attachments are made to affix the bars and magnets. Additional bearing blocks could also be provided. A shaft 106 passes through the bearing blocks 105A and 105B and has a commutator assembly 104A and 104B attached to each end.

Each commutator may be made up of two magnetically conductive sections 130A/130B 132A/132B and a magnetically insulative piece 131 separating the magnetically conductive sections 130A/130B 132A/132B. The commutator 104A and 104B may be mounted directly or indirectly on the central shaft and aligned such that the magnetically conductive sections are substantially aligned with one another. While in this embodiment, substantially identical commutators are used, embodiments with commutators having varying sized conductive sections could be used without departing from the scope of the invention. Similarly, additional conductive and insulative sections could be provided without departing from the scope of the invention.

As the shaft/commutator assembly is rotated in the direction shown by Arrow 201 by the electric motor 122 the magnetically conductive sections 130A/130B, 132A/132B may each become aligned with a magnet 102A/102B and coil bar 103A/103B combination four times per 360 degrees of revolution. During alignment, magnetic flux may be conducted through the path shown by Arrows 301. A pulse of electricity is generated by the magnetic field 302 in the center of the wire coil 107 wrapped about the bar 103A which may flow through any circuit (not explicitly shown) connected to the ends of the coil wire 108 and 109. A similar arrangement occurs on bar 103B (not shown) with wire coil 107B substantially simultaneously.

Figure 2:
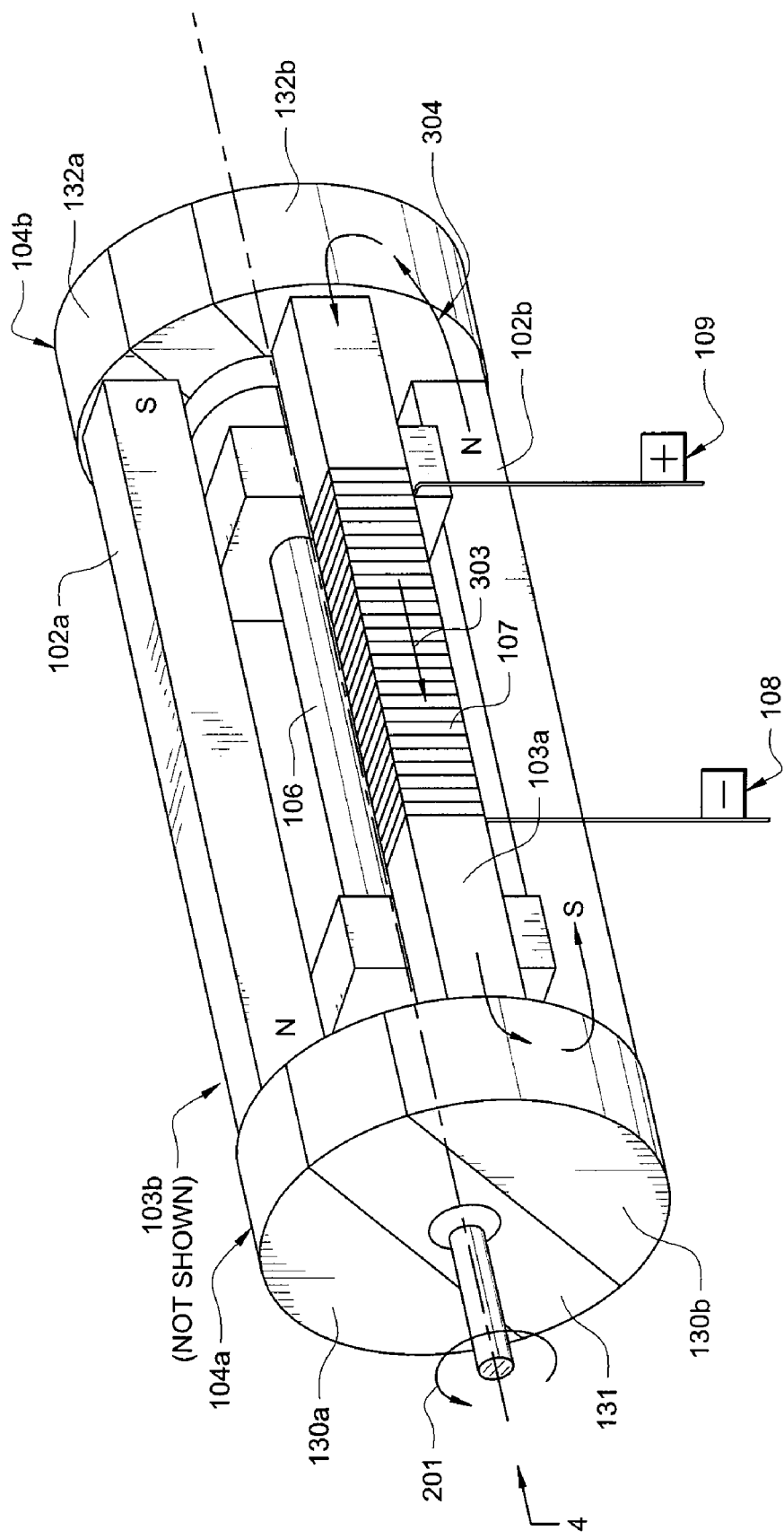
FIG. 2 is a diagrammatic illustration of the generator of FIG. 1 showing a second position of rotation 90 degrees from the first.

As the rotation continues another 90 degrees to the second rotation position as shown in FIG. 2 the alignment with bar 103A has the magnetism supplied by a different magnet 102B. A similar situation is seen by the other bar 103B (not shown). The magnetic flux is in the opposite direction now as shown by the opposite direction of the arrows 304 and by Arrow 303 at the bar with wire coil 103A. The flux is opposite because the bars 102A/102B have their polarity aligned in opposite directions. The flux could be aligned in the same direction without departing from the invention if opposite pulses are not desired. The opposite magnetic flux creates an opposite polarity of electricity in the wire coil from that of rotation position 1 shown by coil wire ends 108 and 109 with opposite polarity compared to FIG. 1. The remaining two of four rotation positions create switched polarity in the wire coils just as position one and position two do. The electricity may alternates polarity four times per revolution in this two magnet, two coil bars configuration.

Figure 8:
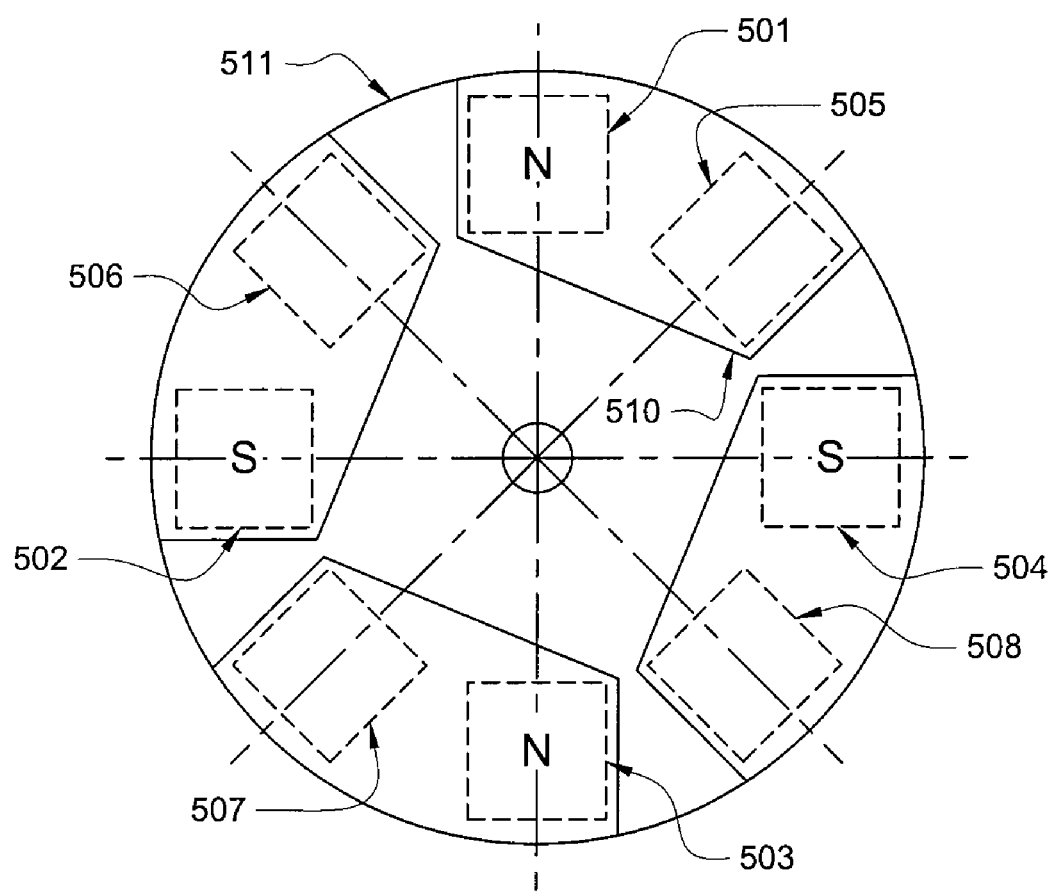
FIG. 8 is an illustration of another embodiment of a generator constructed in accordance with the invention.

Referring to FIG. 8, this embodiment switches polarity 8 times per revolution with four magnets and four coil bars. The rotation speed of this embodiment may be different to obtain a desired number of cycles per second. In FIG. 1 the rotation 201 speed may be set to create 60 cycles per second alternating current, or whatever cycle AC is desired. Fifteen revolutions per second would therefore produce 60 cycles per second AC electricity. As noted above, the generator could be configured to generate something other than AC power.

Figure 3:
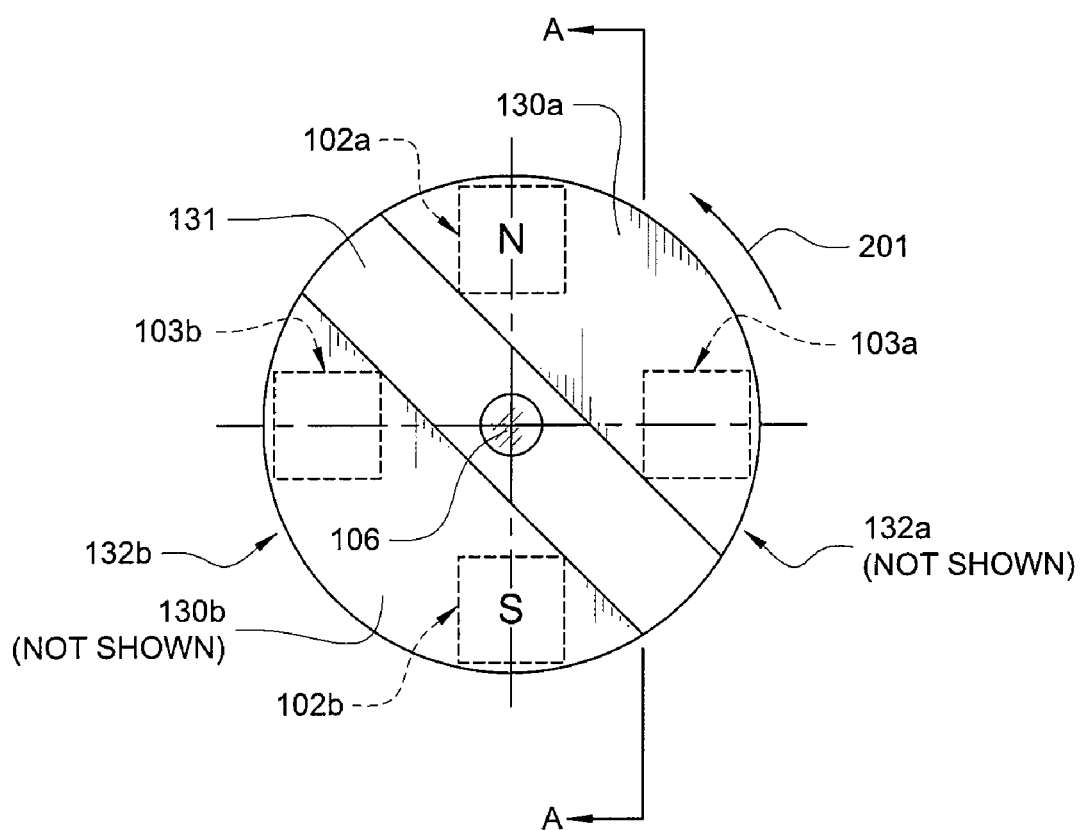
FIG. 3 is an end view of an example commutator of the embodiment of FIG. 1 in the first position of alignment.

FIG. 3 shows an end view of the commutator 104A from FIG. 1. In this first position of rotation 201 the commutator magnetically conductive sections 130A and 132A (not shown) magnetically connect the magnet 102A to the coil bar 103A forming a magnetic circuit that produces electricity in wire coil 107. FIG. 3 also shows the orientation of the two magnet ends 102A and 102B facing the viewer with their opposite magnetic poles. The isolator 131 separates the two commutator magnetically conductive sections 130A and 130B.

Figure 4:
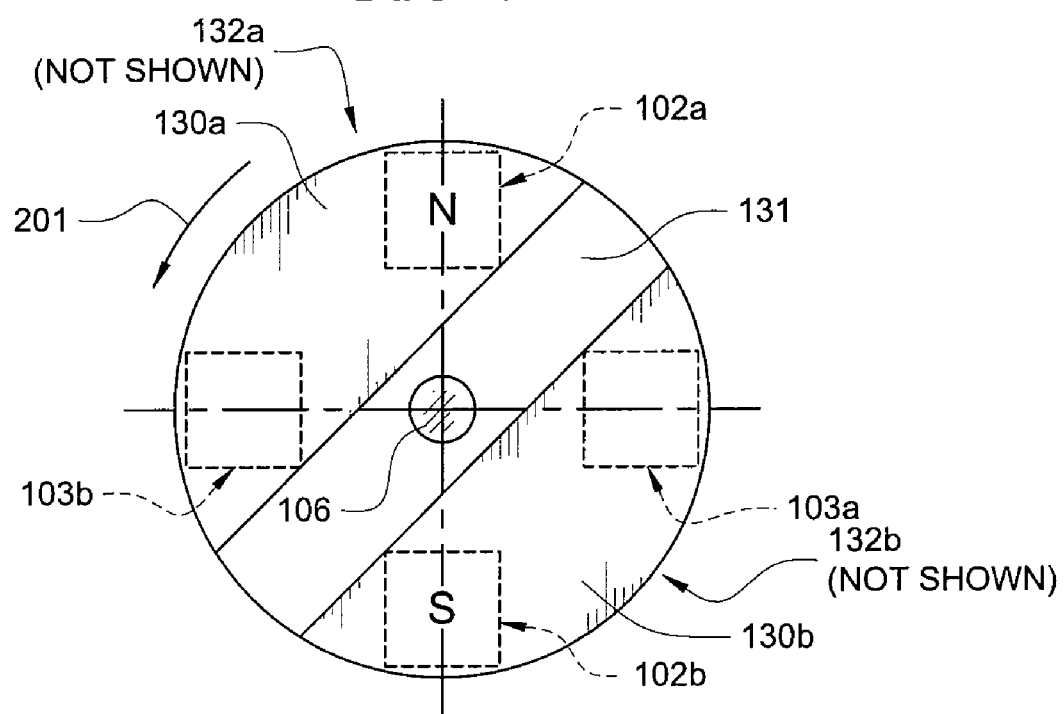
FIG. 4 is an end view of an example commutator of the embodiment of FIG. 1 in the second position of alignment.

FIG. 4 shows an end view of the commutator 104A in the position of FIG. 2. In this second position of rotation which is 90 degrees from the first position, the commutator magnetically conductive sections 130A and 132B magnetically connect a different magnet with its opposite polarity orientation to the same bar.

Figure 5:
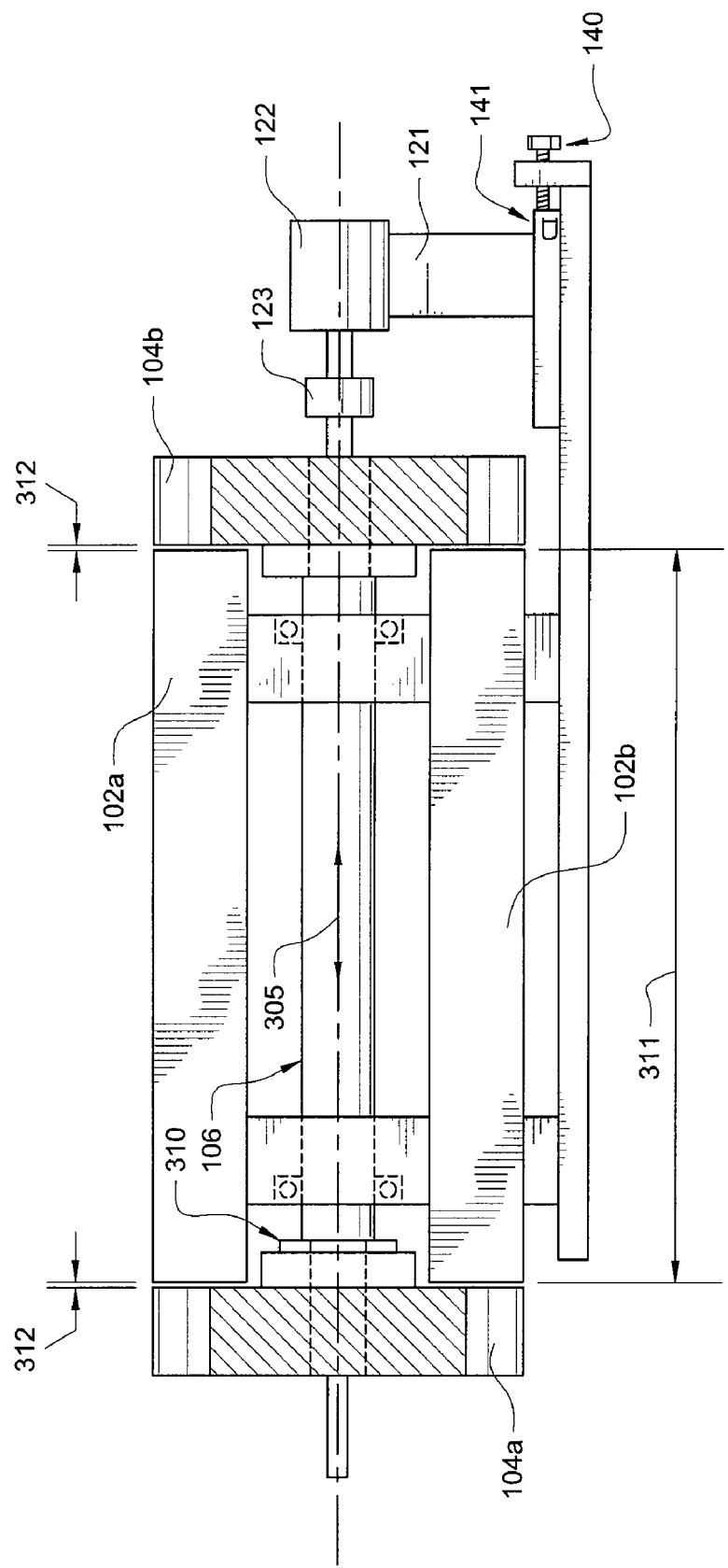
FIG. 5 is a diagrammatic illustration of a side view of the embodiment of FIG. 1.
Figure 6:
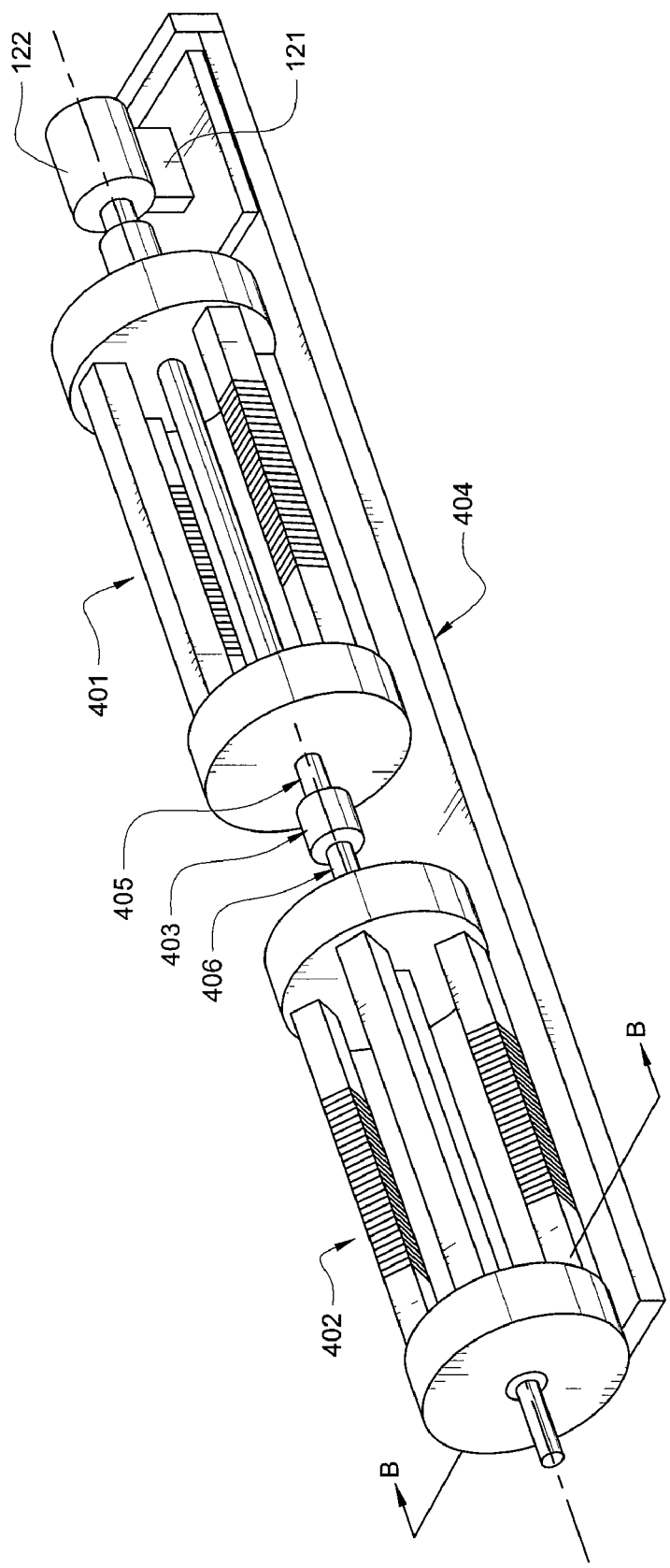
FIG. 6 is a diagrammatic illustration of a second embodiment of an electrical generator constructed in accordance with the invention.
Figure 7:
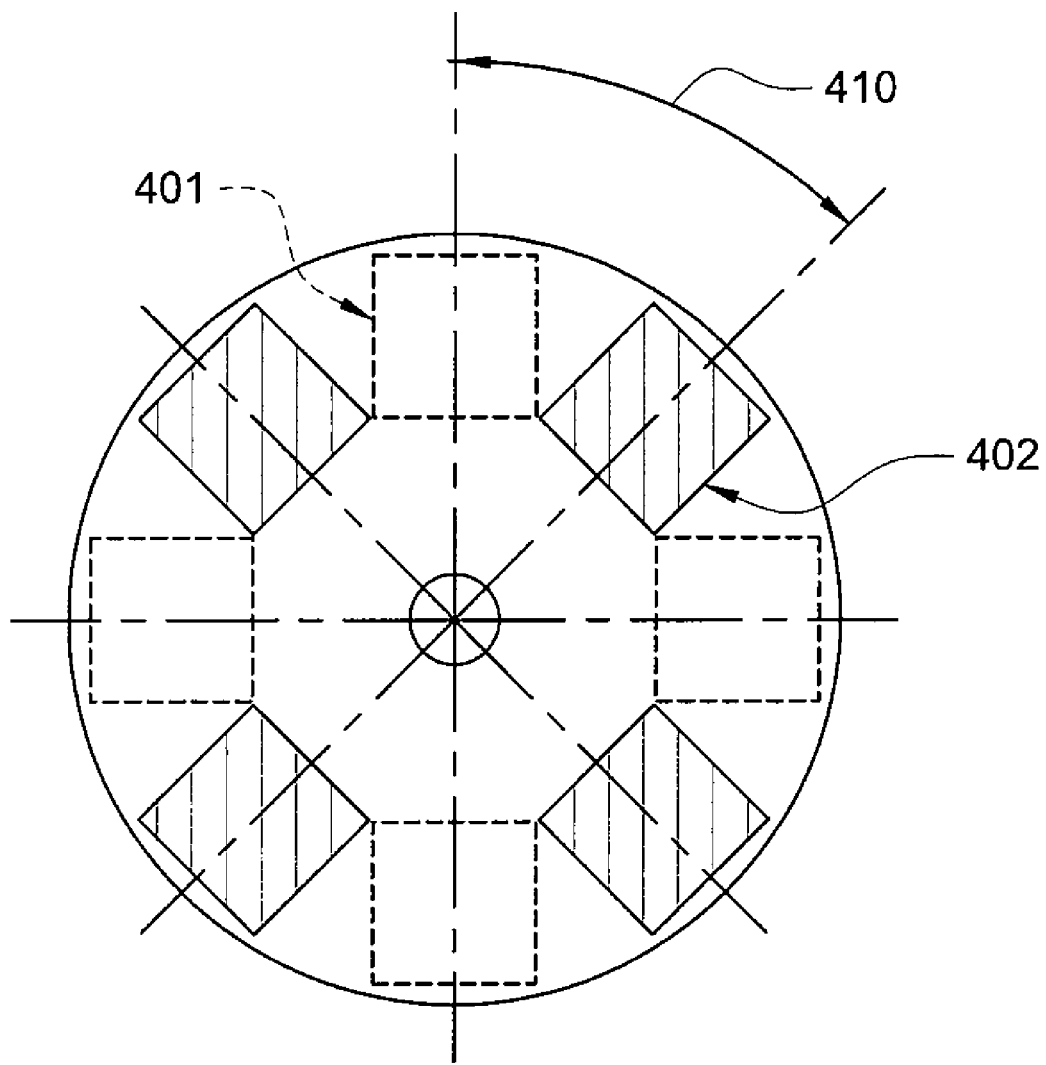
FIG. 7 is end view of an example commutator of the embodiment of FIG. 6.

FIG. 5 is a cut away view AA from FIG. 3 and represents a side view of the embodiment of FIG. 1. To increase output efficiency, the generator in some embodiments may be designed to reduce the air gaps 312 between magnets 102A and 102B and bars 103A and 103B, on the one hand and the commutators 140A and 104B, on the other hand. In some embodiments, the generator will be adjustable to reduce the air gap. This reduction of air gaps 312 by adjustment allows the magnetic flux to pass across the reduced air gap more efficiently, thus inducing a higher current in wire coils 107A and 107B. The example embodiment illustrated in FIG. 5 may be adjusted in two ways to reduce the air gaps. However, any method of reducing the air gaps can be used. One type of adjustment is to have various thicknesses available for the shaft shim 310. By adjusting the thickness of a removable shaft shim 310, one can adjust the thickness of the air gap such that the generator is more efficient but such that mechanical interference with its operation is not created. A second adjustment described above is to move the position of the sliding motor mount 121 (using adjusting screw 140 working on fixed nut 141 in this embodiment) to push or pull the motor and hence the commutator shaft assembly (due to the direct coupling 123) in the direction of Arrow 305, thereby centering the position of the commutators about the magnets and coil bars. Centering will allow shaft shims 310 to be used that reduce the size of the air gaps. Some embodiments will omit or add one or both of these options. In some embodiments, manufacturing tolerances will allow the air gaps 312 to be quite small. A second sliding adjustment and removeable shim (or shims) can be configured to be separate from the aforementioned sliding adjustment when there are two generating units linked together shaft to shaft (as illustrated in FIG. 6). This second sliding adjustment may be attached under the bearing blocks and over the base to center the bearing blocks/magnets/coil bars between their respective commutators to provide a separate adjustment reducing air gaps. While this type of adjustment would most likely be used for generator apparatus 402 of FIG. 6, this type of adjustment could be used in the embodiment of FIG. 1 or for first generator apparatus 401 in FIG. 6 as an alternative to adjustment with the motor assembly.

Another embodiment of the invention is illustrated in FIG. 6. In this embodiment, a double generator single motor configuration is used. The two generators may be linked together (either directly or indirectly). In this embodiment, the generators are linked along the mounting base 404 by a rigid coupling 403 which connects the commutator shafts 405 and 406. In other embodiments, a common shaft could be used for both generators. The first generator apparatus 401 has magnets and bars oriented as previously described in FIG. 1. The second generator apparatus 402 has magnets and bars oriented 45 degrees from the first apparatus 401 expressed as angle 410 seen in FIG. 7.

The orientation of the magnets and bars reduces the rotation resistance created within one apparatus due to attraction and repulsion forces, assuming that substantially similar magnetic forces are created based upon the size, design, orientation, and type of materials used for the magnets, bars, and commutators. In some embodiments, by orienting the generators such that attraction/repulsion forces of the second apparatus are 45 degrees from those of the first apparatus, the forces may substantially cancel one another. These opposite torsional forces reduce the net torsional force due to the coupling 403 between the two commutator shafts, resulting in a substantial increase in efficiency.

Additional increases in generator apparatus efficiency can be made by using stronger magnets. Electromagnets can replace the permanent magnets for a stronger magnetic field. Additionally, Neodimian Iron can be used to make even more powerful magnets. Similarly, super-conducting magnets can make the generator apparatus even more efficient. The embodiment illustrated in FIG. 1 uses two magnets and two coil bars. This embodiment has two wire coils which output electricity. With a second generator apparatus linked to the first as seen in FIG. 6, there are four wire coils which output AC electricity, yet less energy may be required to rotate the commutator shaft due to the substantial cancellation of magnetic attraction/repulsion forces.

The electrical output can be increased by using more magnets and coil bars as seen in FIG. 8. The invention is not limited to particular numbers of magnets and coil bars. The embodiment in FIG. 8 has four magnets 501-504 and four coil bars 505-508. Multiple generators such as illustrated in FIG. 8 may be joined in the manner illustrated in FIG. 6 with the second generator apparatus oriented with an angular offset, in this case 22.5 degrees, to achieve some cancellation of the magnetic attraction/repulsion forces of the first generator apparatus. The commutator magnetically conductive sections 510 illustrated in FIG. 8 are separated by magnetically insulative separator 511.

In some embodiments, generator efficiency may be increased by using magnetic bearings instead of ball or roller bearings. Magnetic bearings will suspend the commutator shaft assembly and electric motor using opposing magnetic fields within the bearings and reduce friction during rotation. Any type of bearing may be used without departing from the scope of the invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in the light of the above disclosure. The scope of the invention is to be defined only by the claims appended hereto, and by their equivalents.

What is claimed is:

1. A generator, comprising:
   a rotatable shaft;
   a first commutator mounted on the shaft comprising a first magnetically conductive portion, and a second magnetically conductive portion;
   a second commutator mounted on the shaft comprising a first magnetically conductive portion, and a second magnetically conductive portion;
   a first wire coil;
   at least two magnetically conductive bars mounted in an opposed relationship, including a first and second magnetically conductive bar, wherein the first magnetically conductive bar passes through the first wire coil;
   at least two magnets mounted in an opposed relationship, including a first magnet and a second magnet; and
   wherein the at least two magnetically conductive bars and the at least two magnets are mounted such that they extend between the first and second commutators.

2. The generator of claim 1,
   wherein the generator comprises two magnetically conductive bars and two magnets which are mounted such that each of the two magnetically conductive bars is approximately 90 degrees apart from each of the two magnets with reference to the axis of revolution of the shaft.

3. The generator of claim 1, further comprising:
   a second wire coil, wherein a second magnetically conductive bar passes through the second wire coil.

4. The generator of claim 1, further comprising:
   an apparatus allowing adjustment of the shaft position such that the magnetically conductive bars and magnets are substantially centered between the first and second commutators relative to the axis of the shaft.

5. The generator of claim 1, further comprising:
at least one removable shim mountable on the shaft between the first and second commutators such that the thickness of the removable shim may be used to alter the distance between the first and second commutators relative to the axis of the shaft.

6. The generator of claim 1, wherein the first wire coil is made of copper.

7. The generator of claim 1, wherein the at least two magnetically conductive bars are made of a metal selected from the group consisting of iron, nickel, cobalt, and alloys thereof.

8. The generator of claim 1, wherein the generator further comprises:
at least two additional magnetically conductive bars mounted in an opposed relationship and mounted such that each of the two additional magnetically conductive bars is approximately 90 degrees apart from each of the first and second magnetically conductive bars with reference to the axis of revolution of the shaft; and
at least two additional magnets mounted in an opposed relationship and mounted such that each of the two additional magnets is approximately 90 degrees apart from each of the first and second magnets with reference to the axis of revolution of the shaft.

9. The generator of claim 8,
wherein each of the second, and two additional magnetically conductive bars pass through different wire coils associated therewith and separate from the first wire coil.

10. The generator of claim 1, further comprising:
a second generator like the first generator described in claim 1, wherein the shaft of the first generator is coupled to the shaft of the second generator and wherein the magnetically conductive bars and magnets of first generator are oriented relative to those of the second generator such that magnetic attraction and repulsion forces on the shaft of the first generator caused by the first generator are at least partially reduced by opposite forces on the shaft of the second generator caused by the second generator.

11. The generator of claim 1, further comprising:
an apparatus operable to turn the shaft.

12. The generator of claim 11, wherein the apparatus is a motor.

13. The generator of claim 1,
wherein the first commutator is shaped like a disk.

14. The generator of claim 1,
wherein the first and second magnets are mounted such that their opposing ends have opposite polarities.

15. A method of generating alternating current, comprising:
rotating a shaft with a first and second commutator mounted thereon, wherein each commutator comprises a plurality of magnetically conductive portions;
receiving alternating current from a first wire coil around a first magnetically conductive bar;
wherein the first magnetically conductive bar is mounted substantially parallel to the axis of the shaft and wherein the magnetically conductive bar forms a magnetic circuit with a first magnet mounted substantially parallel to the axis of the shaft and one of the magnetically conductive portions of each of the first and second commutators.

16. The method of claim 15, further comprising:
causing the rotation of the shaft using a motor.

17. The method of claim 15, further comprising:
adjusting a shim to reduce an air gap between the first commutator and the first magnetically conductive bar.

18. The method of claim 15, further comprising:
providing a second apparatus connected to the shaft such that magnetic attraction and repulsion forces on the shaft are at least partially reduced by opposite forces caused by the second apparatus.

19. The method of claim 15, further comprising:
adjusting the generator such that the first magnetically conductive bar and the first magnet are substantially centered between the first and second commutators relative to the axis of the shaft.

20. The method of claim 15, further comprising:
wherein the first and second commutator are round.

* * * * *